United States Patent [19]
Isaksson

[11] Patent Number: 5,183,641
[45] Date of Patent: * Feb. 2, 1993

[54] DISTRIBUTOR PLATE IN A FLUIDIZED BED REACTOR

[75] Inventor: Juhani Isaksson, Karhula, Finland

[73] Assignee: A. Ahlstrom Corporation, Karhula, Finland

[*] Notice: The portion of the term of this patent subsequent to May 14, 2008 has been disclaimed.

[21] Appl. No.: 578,420

[22] Filed: Sep. 26, 1990

Related U.S. Application Data

[62] Division of Ser. No. 232,774, Aug. 16, 1988.

[51] Int. Cl.$^5$ ............ F23D 1/00; F27B 15/02; B01J 8/18
[52] U.S. Cl. .................... 422/143; 110/229; 110/245; 34/57 A; 122/4 D; 422/311; 431/7; 431/170
[58] Field of Search .......... 422/143, 139, 311; 34/57 A; 110/245, 229; 122/4D; 431/7, 170

[56] References Cited

U.S. PATENT DOCUMENTS

| | | | |
|---|---|---|---|
| 3,074,777 | 1/1963 | Cortes | 422/139 X |
| 3,277,582 | 10/1966 | Munro et al. | 422/143 X |
| 3,361,539 | 1/1968 | Pyzel | 422/143 |
| 3,419,253 | 12/1968 | Eckert | 422/311 X |
| 3,462,246 | 8/1969 | Copeland | 422/143 |
| 3,505,030 | 4/1970 | Sowards | 422/311 X |
| 5,014,632 | 5/1991 | Isaksson | 422/143 X |

Primary Examiner—Robert J. Warden
Assistant Examiner—T. A. Trembley
Attorney, Agent, or Firm—Nixon & Vanderhye

[57] ABSTRACT

The grid plate is disposed between the fluidized bed reactor chamber and an underlying wind box and includes a plurality of nozzles for feeding fluidizing gas from the wind box into the reaction chamber. The nozzles are configured to afford different pressure drops across the grid such that with increasing pressure, additional nozzles are actuated in response to increasing pressure differences across the plate whereby fluidized bed start-up and steady state operating conditions may be facilitated.

22 Claims, 2 Drawing Sheets

DISTRIBUTOR PLATE IN A FLUIDIZED BED REACTOR

This is a division of application Ser. No. 07/232,774, filed Aug. 16, 1988.

BACKGROUND OF THE INVENTION

The present invention relates to an apparatus and methods for feeding fluidized gas into a fluidized bed reactor. The invention is especially suitable for pressurized fluidized bed systems and for feeding fluidizing gas into a reactor to start up the fluidization of the bed.

The invention relates more particularly to a distributor or grid plate in the fluidized bed reactor, disposed between the bottom part of the reactor chamber and wind box beneath the reactor chamber, the plate having nozzles for delivering fluidizing gas into the reactor chamber from the wind box.

Fluidized bed reactors are used, e.g., in combustion, gasification and steam generation processes. Typically, fluidized beds include a lower grid plate for supporting the bed of particulate material which usually includes a mixture of fuel material, inert bed material and eventual adsorbents or catalysts for $SO_x$ or $NO_x$ removal. The grid plate typically has a plurality of gas or air passages therethrough. A wind box or air chamber is disposed below the grid plate and gas or air is introduced into the wind box under pressure. A fan or blower is conventionally used for delivering pressurized gas into the wind box. The gas flows upwardly through the gas passages in the grid plate and suspends the bed above the grid plate in a fluidized state. As a result of the fluidized state, good mixing of gases and solids in the reactor chamber is achieved. This provides relatively uniform temperatures in the reactor, effective combustion processes, good heat transfer characteristics and favorable adsorption of $SO_x$ and $NO_x$.

Trouble-free operation of the bed requires a certain fluidizing velocity of the gas or air supplied the reactor chamber and an even distribution of gas is essential for processes taking place in fluidized beds. The gas blower must also overcome the flow resistance of the nozzles or the pressure drop (dp) over the nozzles to give a predetermined minimum gas flow which results in a desired fluidizing gas velocity above the grid. A minimum pressure drop $dp_{min}$ over the grid is required as well to prevent the bed material from flowing back through the nozzles into the wind box. Furthermore, if the pressure drop is too small, the distribution of gas through the nozzles tends to become uneven, the gas flowing mainly through some of the nozzles and not at all through others. Accordingly, nozzles with a suitable minimum pressure drop also at low load conditions should be chosen for the grid plate. The pressure drop over the grid, on the other hand, must not rise too high as this would result in unacceptably high power demands on the gas blower. A blower that could overcome very high pressure drops at high load conditions, does not, on the other hand, function very well at low load conditions. With the technique of the present invention, the holes or nozzles are designed to allow a sufficient amount of gas to flow through the grid at normal reactor pressure, temperature and load.

A pressure drop of about 1-10 kPa over the grid is usually acceptable.

The pressure drop in a nozzle depends on
the construction of the nozzle, (k)
the flow through the nozzle, e.g., the flow velocity (v)
the density of the fluidizing gas ($\sigma$) according to the following formula:

$$dp = k^* \sigma^* v^2 / 2 \qquad (1)$$

The pressure drop (dp) in a nozzle is decreased when (a) the capacity of the reactor is increased, that is, when the gas flow (v) is increased or when (b) the density ($\sigma$) of the gas is increased e.g., by increasing the pressure in the reactor.

If, for instance, the gas flow is increased five- to tenfold, the pressure drop will increase twentyfive- to hundredfold. If, at the same time, the pressure in the reactor is increased about tenfold, the pressure drop will grow 250- to a thousandfold. This, of course, is not acceptable.

The pressure drop can be decreased by using mechanically controlled nozzles in which the cross-section of the gas passengers can be changed, increased or decreased, to keep the pressure drop at a permitted level. But mechanically controlled nozzles are very delicate devices and do not operate satisfactorily under the operating conditions in a fluidized bed. The nozzles have to be made very accurate and, accordingly, necessarily are formed of expensive materials. They would hardly function in furnaces at high temperature conditions.

Other methods for changing the pressure drop over the grid have been suggested. In U.S. Pat. No. 4,429,271, there is suggested the use of a nozzle having a nipple, a cap and a bushing, wherein the cap is provided with at least one gas distribution passage. The pressure drop in the nozzle is changed by removing the bushing from under the grid plate and threading in another bushing with the required orifice size. This, of course, cannot easily be done during operation of the reactor.

In U.S. Pat. No. 4,648,330, there is suggested a complicated arrangement of nozzles, connected to separate fluidizing gas delivery means, and situated in successive ranged planes. The highest nozzles are initially supplied with fluidization gas at the start-up of the supply of fluidization gas.

The start-up of the fluidized bed reactor is always a problem, especially the start-up of large size units. It has been suggested to start up the reactor by fluidizing first one part of the reactor and then gradually the whole cross-section of the reactor.

In U.S. Pat. No. 4,453,494, there is suggested a start-up method for a fluidized bed reactor, where the bed is made up of a plurality of modules. The fluidizing air system is also compartmented, so that the air flow to each module can be independently controlled. Two start-up burners are located in two modules, to establish the initial combustion. These modules do not contain heat exchange surfaces and can be rapidly brought up to ignition temperature. After these two modules are ignited, coal and air are supplied to the adjacent sections so that the combustion of the coal can be progressively spread from one module to the other. In this method, however, the bed material tends to build up on non-fluidized modules and thus destroy the parameters under which the bed operates. This can at least partly be overcome as is shown in U.S. Pat. No. 4,436,507 by using air nozzles to dissipate the accumulated bed material. As a result, the height of the bed can be maintained substantially level.

SUMMARY OF THE INVENTION

It is an object of the present invention to provide a simple method and apparatus for supplying gas to a fluidized bed in such a manner as to avoid the difficulties discussed above.

It is an object of the invention to provide a nozzle grid for distribution of fluidizing gas in which the grid is self-adjusting according to the increase in pressure drops over the grid.

It is a further object of the invention to simplify start-up of fluidization of a fluidized bed material.

According to the invention, there is provided a nozzle grid with two or more kinds of nozzles having different specific initial pressure drops or which are initiated at different pressure drops over the grid. The nozzles are initiated automatically at predetermined pressure drops over the grid between the wind box and the reactor chamber.

The phenomenon that some gas nozzles have a specific initiation pressure is used to advantage in this invention. The distribution plate in the reactor comprises nozzles of two or more different kinds, nozzles that are initiated at different pressure drops. Nozzles having specific initial pressure drops lower than the pressure difference between reactor chamber and wind box are the only ones which allow gas to flow through the grid at the start-up. At higher loads with increasing flow velocities, the pressure drop over the grid increases and additional nozzles having higher initial pressure drops are initiated and allow more gas to flow through the grid.

Accordingly, if the reactor is to be pressurized, some of the nozzles with lower initial pressure drops are initiated at lower reactor pressure or lower gas densities and others are initiated when the pressure or gas density has reached the steady state condition.

In accordance with a preferred embodiment of the invention hereof, there is provided a fluidized bed reactor having a reactor chamber and a wind box below the reactor chamber. A grid plate for disposition between the reactor chamber and the wind box is also provided, the grid plate including a plurality of nozzles for feeding fluidizing gas from the wind box into the reactor chamber, at least two of the nozzles being configured to provide different pressure drops across the grid, respectively.

In accordance with another aspect of the present invention, there is provided a fluidized bed reactor, having a reactor chamber, a wind box below the reactor chamber and a grid plate for disposition between the reactor chamber and the wind box. The grid plate includes a plurality of nozzles for feeding fluidizing gas from the wind box into the reactor chamber, the nozzles having different specific initial pressure drops across the grid.

In accordance with a further aspect of the present invention, there is provided a fluidized bed reactor comprising a fluidized bed reaction chamber operable at an optimal predetermined fluidizing gas flow, a wind box disposed below the chamber and a grid plate in the reactor disposed between the reaction chamber and the wind box. Means are carried by the grid plate and include at least a pair of nozzles for feeding fluidized gas from the wind box through the grid plate to the reaction chamber, the two nozzles being configured to provide different initial pressure drops across the grid plate, respectively. One of the nozzles has an initial pressure drop such that gas flows therethrough initially at a gas flow corresponding to more than 20% of the predetermined fluidizing gas flow in the reactor.

In accordance with a still further aspect of the present invention, a method is provided for starting up a fluidized bed reactor having a reaction chamber, a wind box, a grid plate therebetween and a plurality of nozzles through the grid plate for flowing fluidizing gas from the wind box to the reaction chamber and includes the steps of initiating a flow of gas through one of the nozzles at a first predetermined pressure drop across the grid plate and initiating a flow of gas through a second nozzle at a second predetermined pressure drop across the grid plate higher than the first predetermined pressure drop.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
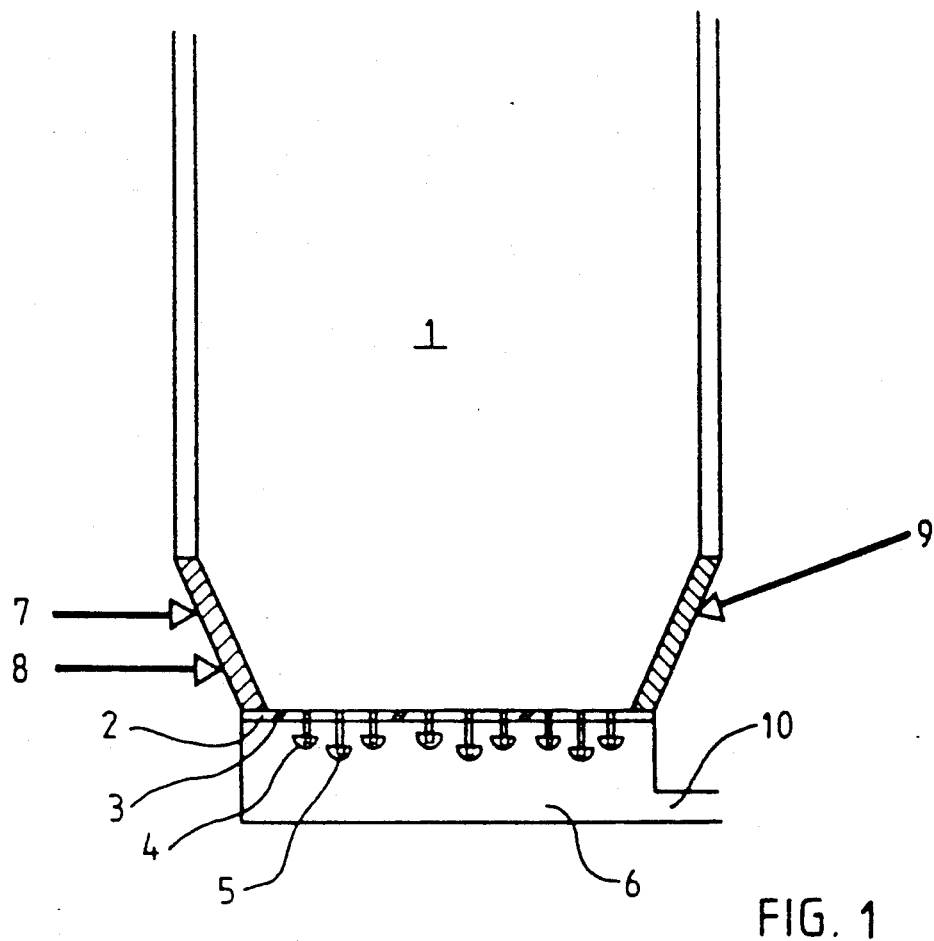
FIG. 1 is a schematic cross-sectional view of a fluidized bed reactor and illustrating a grid plate according to the invention.

In FIG. 1, there is shown a fluidized bed reactor 1 having a grid plate 2 in its bottom part and a wind box or air chamber 6 beneath grid plate 2. Fuel and additional material, e.g., adsorbing agents, are fed into the reactor chamber through inlets 7 and 8, respectively. If the fluidized bed reactor is operated with a circulating bed, the bed material is recirculated into the reactor through a pipe 9. An air blower, not shown, feeds air into air chamber 6 through inlet 10.

Figure 2:
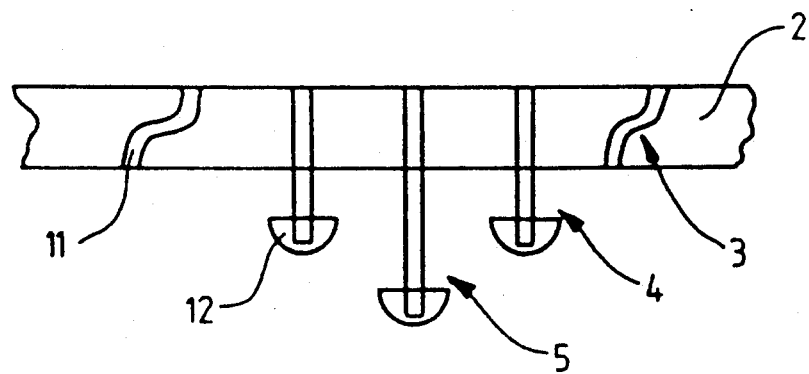
FIG. 2 is a schematic cross-sectional view of nozzles, according to one embodiment of the invention, for the grid plate and having different pressure drops.

Nozzles 3, 4 and 5 are disposed in the grid plate. The nozzles are initiated to operate at different specific pressure drops over the grid or pressure differences between the reactor chamber 1 and the air chamber 6. In a preferred embodiment, nozzle 3 is in the form of an S-pipe, as shown in FIG. 2, and has the lowest initial pressure drop of the nozzles illustrated. Nozzles 4 and 5 comprise pipes disposed in the grid plate and which have upper discharge ports opening into the reactor chamber and lower inlet ports opening into respective cups 12 in the air chamber. Nozzles 4 and 5 have specific pressure drops dependent on the length and inner diameter of the pipes. The pipes have their upper openings at the same elevation as the upper horizontal surface of the grid plate but extend downwardly to different elevations beneath the grid plate in the air chamber.

The pipes are filled with particles at start-up of the fluidized bed. The height of the particle column in each pipe fixes the initial pressure drop needed over the grid to initiate operation of that nozzle, pressure drops of about 2–5 kPa being frequently used. The higher the column of particles, the higher the pressure drop. The specific pressure drop over a nozzle in operation is also dependent on the length of the pipe but, after the initial moment, is much lower, about 0.5-1.5 kPa.

Figure 3:
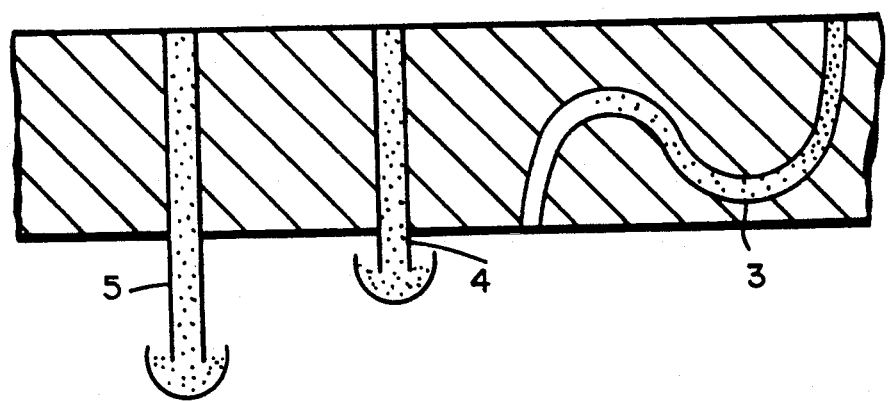
FIG. 3 is a fragmentary enlarged cross-sectional view illustrating the nozzles with the particulate material therein, two nozzles being illustrated to demonstrate flow at different pressure drops across the nozzles.

The cup 12 beneath the nozzle pipe prevents bed material from flowing out of the pipe when the air flow is decreased or stopped. Thus, in FIG. 3, the nozzles 3, 4 and 5 are illustrated as having particulate material therein with corresponding associated initial pressure drops across the grid plate.

At very low pressure drops, the S-pipe nozzles are more suitable. There is a small amount of sand or bed material in the nozzle at start-up but this is easily blown upwards at low flow rates.

With a system according to the invention, a grid plate which operates very well at a low load is readily provided and which plate has an acceptable pressure drop between its opposite sides even if the air flow increases to 5-100-fold, additional nozzles being initiated according to pressure drop. The grid plate is self-adjusting and does not need moving or delicate devices.

At starting-up, the normal air pressure is prevailing in the reactor chamber 1 and air chamber 6. The air blower begins to feed air into the air chamber increasing the pressure below the grid plate 2. At an air flow rate 10% of the nominal air flow rate, the pressure drop over the grid plate reaches a predetermined level, e.g., 1.5 kPa, at which the bed material in the nozzles 3 is blown out. Once blown out, the pressure drop over the grid plate decreases to below 1.5 kPa as air flows into the reactor chamber. As the air flow rate is continuously increased, the pressure drop begins to increase again and reaches a level, e.g., 2-4 kPa at which time the bed material in the nozzles 4 is blown out. Air then begins to flow through these additional nozzles into the reactor chamber. After the nozzles 4 have been initiated, the pressure in the air chamber decreases abruptly to a level below 1.5 kPa. But if the air flow rate is still increased, the pressure drop over the grid will gradually increase again. If the pressure drop over the grid increases above 4.5 kPa the bed material in nozzles 5 is blown out and air begins to flow through these nozzles. The pressure drop over the grid thus decreases once again to a lower level, for example, below 1.5 kPa. The system of nozzles having different initial pressure drops makes it possible to keep a suitable pressure drop over the grid although air flow rates are increased. The nozzles can be arranged so that first nozzles are initiated immediately at the beginning of the start-up, second nozzles are initiated at 20-30% of nominal flow rate and third nozzles which need the highest pressure drop are initiated at 60-70% of nominal flow rate. Usually about 20-30% of the nozzles could be of the first type, 20-40% of the second type and 20-40% of the third type. It is, of course, possible to use only two different types of nozzles or in some processes more than three different types of nozzles.

The system with nozzles having different initial and specific pressure drops is specifically suitable in pressurized fluidized bed reactors. The pressure drop is depending on the formula $$dp = k * \sigma * v^2 / 2$$

At low pressures, nozzles 3 with specific pressure drop $k_1$ are in operation. The specific pressure drop is dependent on the construction of the nozzle. When the pressure in the system is increased, the pressure drop over the grid will increase because, if the density of the flowing medium is increased, so is the pressure drop according to the formula above. At a predetermined pressure, the initial pressure drop for nozzles 4 is reached and air begins to flow through these nozzles. Thus, the pressure drop over the grid is decreased to an acceptable level. If the pressure in the fluidized bed reactor system is still increased, the pressure drop begins to increase again. If the pressure drop tends to grow too high, a third kind of nozzle 5 having a relatively high initial pressure drop can be disposed in the grid plate. At a predetermined pressure drop over the grid, air will flow through all nozzles and the pressure drop over the grid will decrease. The arrangement makes it possible to keep the pressure drop over the grid at an acceptable level at all stages of operation. The nozzle arrangement can be varied to suit particular circumstances and process requirements.

Nozzles having different initial pressure drops of different kinds than those shown in this application can, of course, be used within the scope of the claims.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fluidized bed reactor for combustion or gasification processes having a reactor chamber for particulate material, a wind box below the reactor chamber, and a grid plate for disposition between the reactor chamber and the wind box at an interface therebetween, the improvement comprising a plurality of nozzles distributed across and through said grid plate including in a central portion thereof for substantially evenly distributing across said grid plate fluidizing gas from the wind box into the reactor chamber, and means including first and second sets of said plurality of nozzles having respective particulate material retention means for enabling flow of fluidizing gas from said wind box through said nozzle sets into said reactor chamber at different initial pressure drops across said grid plate, respectively, during initial fluidization of said reactor whereby, upon said initial fluidization, gas flow through said first and second sets of nozzles commences sequentially in response to said different initial pressure drops, respectively.

2. A grid plate according to claim 1 wherein said first and second sets of nozzles have means defining different columnar heights of particulate material thereby affording said different pressure drops.

3. A grid plate according to claim 2 wherein the nozzles of each set thereof each comprise a tube opening at its upper end through the upper surface of the grid plate for flowing fluidizing gas into the reaction chamber and opening its lower end into the wind box of the reactor, the length of the tube of one of said at least two nozzles being different than the length of the tube of the other of said at least two nozzles such that different columnar heights of particulate material in said tubes are provided to afford said different pressure drops across said grip plate.

4. A grid plate according to claim 3 wherein said particulate material retention means includes a generally cup-shaped element carried by each of said tubes and spaced from their lower ends to enable fluidizing gas to flow from the wind box into the tubes and reaction chamber and preventing backflow of particulate material into the wind box.

5. A grid plate according to claim 2 wherein at least one of said two sets of nozzles includes nozzles having a sinuous path within said grid plate for opening into the reaction chamber and the wind box through respective opposite faces of said grid plate.

6. A grid plate according to claim 5 wherein the other of said two sets of nozzles comprises a tube opening at its upper end through the upper surface of said grid plate for flowing fluidizing gas into the reaction chamber and opening at its lower end into the wind box of the reactor.

7. In a fluidized bed reactor having a reactor chamber for particulate material, a wind box below the reactor chamber, and a grid plate for disposition between the reactor chamber and the wind box at an interface therebetween, the improvement comprising first and second sets of nozzles through said grid plate for feeding fluidizing gas from the wind box and substantially evenly distributing the gas into the reactor chamber after initial fluidization thereof, and means for providing different initial pressure drops across said first and second sets of nozzles in said grid plate during initial fluidization of said reactor including means carried by the nozzles of said first and second sets of nozzles for retaining different magnitudes of particulate material therein, respectively, whereby gas flow through said first and second sets of nozzles during initial fluidization of said reactor is initiated sequentially in response to pressure drops across said grid plate corresponding to said different pressure drops, respectively.

8. A fluidized bed reactor according to claim 7 wherein at least one of said two sets of nozzles includes nozzles having a sinuous path within said grid plate for opening into the reaction chamber and the wind box through respective opposite faces of said grid plate.

9. A fluidized bed reactor according to claim 7 wherein said first and second sets of nozzles open below said grid plate, said particulate material retaining means including a generally cup-shaped element carried by said first and second sets of nozzles and spaced from the openings thereof below said grid plate to enable fluidizing gas to flow from the wind box into the first and second sets of nozzles and the reaction chamber and to prevent backflow of particulate material from the reaction chamber into the wind box.

10. A fluidized bed reactor for combustion or gasification processes comprising:
   a fluidized bed reaction chamber for particulate material and operable at a predetermined fluidizing gas flow rate;
   a wind box disposed below said fluidized bed reaction chamber;
   a grid plate in said reactor disposed between said fluidized bed reaction chamber and said wind box at an interface therebetween;
   means carried by said grid plate including first and second sets of nozzles for feeding fluidizing gas from said wind box through said grid plate for substantial even distribution of the fluidizing gas across said grid plate into said fluidized bed chamber after start-up of the reactor; and
   particulate material initially disposed inside said first and second sets of nozzles;
   said first and second sets of nozzles having retention means for retaining different quantities of said particulate material inside said nozzles for providing different initial pressure drops across said grid plate, respectively, said second set of nozzles having an initial pressure drop such that fluidizing gas flows therethrough initially at a fluidizing gas flow rate corresponding to a percentage of the predetermined fluidizing gas flow rate in the reactor different than the percentage of the predetermined fluidizing gas flow rate in the reactor at which gas initially flows through said first set of nozzles.

11. A fluidized bed reactor according to claim 10 wherein said first set of nozzles has an initial pressure drop such that fluidizing gas flows therethrough initially at a fluidizing gas flow rate corresponding to more than 20% of the predetermined fluidizing gas flow rate in the reactor and cannot flow therethrough at less than 20% of the predetermined fluidizing gas flow rate in the reactor.

12. A fluidized bed reactor according to claim 10 wherein said first set of nozzles has an initial pressure drop such that fluidizing gas flows therethrough initially at a fluidizing gas flow rate corresponding to more than 80% of the predetermined fluidizing gas flow rate in the reactor.

13. A fluidized bed reactor according to claim 10 wherein said first and second sets of nozzles open below said grid plate, and including a generally cup-shaped element carried by said first and second sets of nozzles and spaced from the openings thereof below said grid plate to enable fluidizing gas to flow from the wind box into the nozzles and reaction chamber and to prevent backflow of particulate material from the reaction chamber into the wind box.

14. A method of starting up a fluidized bed reactor having a reaction chamber, a wind box, a grid plate at an interface therebetween and a first and second sets of nozzles through the grid plate each for flowing fluidizing gas from the wind box and substantially evenly distributing the fluidizing gas across said grid plate and into the reaction chamber, comprising the steps of providing particulate bed material inside said first set of nozzles and establishing at least in part a first predetermined pressure drop across said first set of nozzles before fluidizing gas may flow therethrough, initiating flow of fluidizing gas from the wind box into said reaction chamber through the said first set of nozzles at said first predetermined pressure drop across the grid plate sufficient to blow the particulate bed material out of said first set of nozzles, providing particulate bed material inside said second set of nozzles, and establishing at least in part a second predetermined pressure drop across said second set of nozzles before gas may flow therethrough, and initiating the flow of fluidizing gas through said second set of said nozzles from the wind box into said reaction chamber at said second predetermined pressure drop across the grid plate higher than said first predetermined pressure drop and sufficient to blow the particulate bed material out of said second set of nozzles, whereby, at reactor start-up, fluidizing gas flows through said first set of nozzles before flowing through said second set of nozzles.

15. A method according to claim 14 wherein fluidizing gas flow through said first and second sets of nozzles is initiated in response to said first and second predetermined pressure drops across said grid plate, respectively.

16. A method according to claim 14 including the step of forming said first and second sets of nozzles to accommodate different quantities of particulate bed material therein such that the pressure drops across the grid plate at which flows are initiated in said first and second sets of nozzles are provided, in part, by said different quantities of particulate bed material therein.

17. A method according to claim 14 including the step of preventing flow of particulate bed material through the first and second sets of nozzles from the reaction chamber into the wind box.

18. A method according to claim 14 including the step of forming said first and second sets of nozzles to different lengths for containing different quantities of the particulate bed material such that the pressure drops across the grid plate at which flows are initiated in said first and second sets of nozzles are provided, at least in part, by particulate bed material in the different lengths of said first and second sets of nozzles.

19. A method according to claim 14 including, simultaneously with the step of initiating fluidizing gas flow through said first set of nozzles, preventing flow of fluidizing gas through said second set of nozzles.

20. In a fluidized bed reactor having a reactor chamber containing particulate material, a wind box below the reactor chamber, and a grid plate for disposition between the reactor chamber and the wind box at an interface therebetween, the improvement comprising first and second sets of a plurality of nozzles in said grid plate each for feeding fluidizing gas from the wind box and substantially evenly distributing it in the reactor chamber, and means carried by said grid plate for enabling initiation of fluidizing gas flow through said first and second sets of nozzles during initial fluidization of said reactor at two different pressure drops across said grid plate, respectively, including means carried by said first and second sets of nozzles for retaining particulate material therein whereby fluidizing gas flow through said first and second set of nozzles during reactor start-up is initiated in response to pressure drops across said grid plate corresponding to said different pressure drops, respectively.

21. A fluidized bed reactor according to claim 20 wherein said fluidizing gas flow enabling means includes means preventing flow of fluidizing gas through said second set of nozzles at a pressure drop across said grid plate corresponding to the pressure drop at which fluidizing gas flow is initiated through the first set of said plurality of nozzles.

22. A method of starting up a fluidized bed reactor having a reaction chamber, a wind box, a grid plate at an interface therebetween, and first and second sets of a plurality of nozzles each through the grid plate for flowing fluidizing gas from the wind box to the reaction chamber, comprising the steps of initiating flow of fluidizing gas through said first and second sets of the plurality nozzles in sequences in proportion to increasing initial pressure drops across said grid plate.

* * * * *